April 21, 1959      F. D. JONES      2,882,669
CORN PICKER GATHERING CHAINS
Filed Sept. 27, 1956
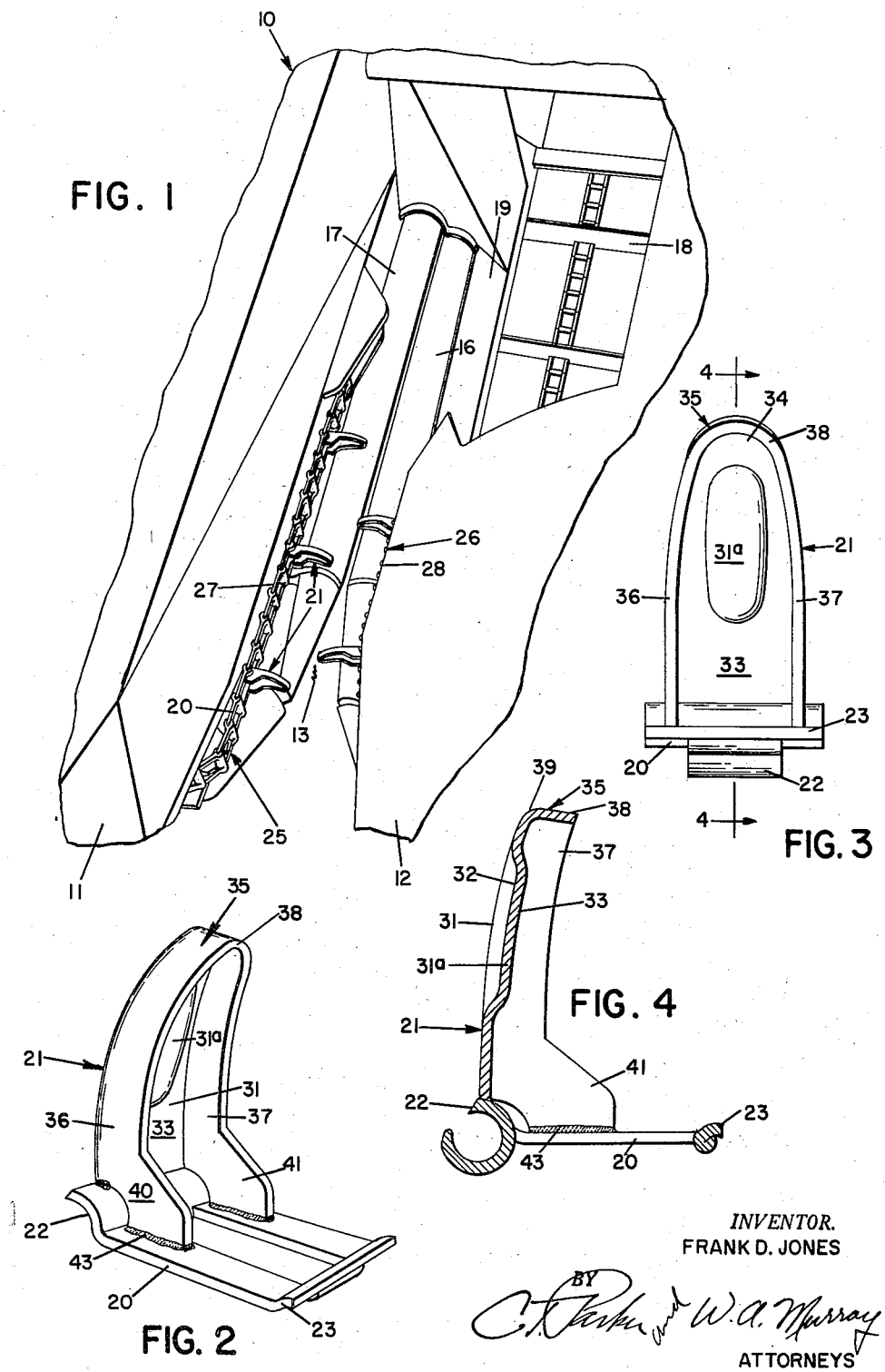
INVENTOR.
FRANK D. JONES
ATTORNEYS United States Patent Office 2,882,669
Patented Apr. 21, 1959

2,882,669

CORN PICKER GATHERING CHAINS

Frank D. Jones, Moline, Ill., assignor, by mesne assignments, to Deere & Company, a corporation of Delaware Application September 27, 1956, Serial No. 612,540

7 Claims. (Cl. 56—111)

This invention relates to a corn harvester and more particularly to the gathering mechanism on the harvester. Still more particularly it relates to the gathering chains of the mechanism.

One of the primary problems now present in a conventional corn picker is that of premature shelling of the corn while in the process of being harvested from the stalks. The more conventional method of harvesting corn at the present time is to provide a harvesting unit forming a stalk passage and movable over a field of row planted corn so that the stalks of the row will move successively through the passage. Harvesting mechanism in the form of a pair of cooperating snapping rolls on opposite sides of the passage are provided and operate to draw the stalk downwardly while restricting passage of the ears thereby serving to "snap" the ears from the stalks. Also provided in the harvesting mechanism is a pair of gathering chains having lugs extending into the passage which serve to guide the stalks into the passage and the ears upwardly over the rolls. The more conventional type lug consists generally of a flat piece of metal fixed to a link of the chain and extending inwardly into the passage. It has been noted that considerable shelling of the corn occurs due to the fact that the ears will fall against the sharp edges of the lug thereby disloding kernels adjacent to that portion of the ear coming in contact with the lug, or in many instances the ear will wedge itself momentarily against a part of the corn picker and a quantity of corn will be shelled from the ear by the sharp edges of the chain lugs before the ear can adjust itself properly in the nip of the cooperating snapping rolls.

It is the primary object of this invention to provide a lug for the gathering chains of the corn harvester which is designed to eliminate all of the sharp edges on the lug which normally come into contact with the ears.

It is also an object of this invention to provide a lug on the gathering chain which has a marginal skirt around the edges of the lug extending in a trailing direction relative to the direction of travel of the chain.

Other objects and advantages of the present invention will become apparent to those skilled in the art as the nature of the invention is better understood following a full disclosure as shown in the accompanying drawings.

Fig. 1 is a front perspective of a portion of a corn harvester which incorporates a gathering chain having the principles of the present invention.

Fig. 2 is a side perspective of the lug and the associated link of the gathering chain.

Fig. 3 is an end view of the lug.

Fig. 4 is a sectional view taken along the lines 4—4 of Fig. 3.

Now in reference to Fig. 1 the corn picker is of a conventional design, not unlike in detail to that shown and described in U.S. Patent 2,622,382, issued to W. E. Slavens, December 23, 1952. The corn picker has a housing structure, indicated in its entirety by the reference numeral 10, having a pair of forwardly extending points, not shown in full but indicated as to locality by reference numerals 11 and 12, which are spaced apart transversely and form the forward portion of a stalk passage 13. The harvester is mounted on a mobile frame, not shown, which moves the harvester forwardly over a field of row planted corn so as to permit the stalks to enter the passage 13 from the forward end. Positioned in the stalk passage 13 is a pair of cooperating snapping rolls 16 and 17 which rotate in opposite directions so as to cause their adjacent portions to move in a downward direction, the purpose being to engage the stalks in the passageway 13 and to drive them downwardly and under the harvester as it moves forwardly so as to break or snap the ears from the stalks. The rear end of the snapping roll 17 is positioned above the rear end of the snapping roll 16 to initiate movement of the ears laterally outwardly at that end. Positioned outwardly of the snapping rolls is a flight type conveyor 18 receiving the ears moving from the rear portions of the snapping rolls 16 and 17 and transferring them rearwardly to a husking unit. The panel 19 conveys the ears from the snapping rolls 16 and 17 into the lower end of the elevator 18.

Also positioned on opposite sides of the passage 13 are a pair of transversely spaced gathering chains 25, 26 which have inner runs 27 and 28 respectively on opposite sides of the passage 13. Suitable sprockets, not shown, are provided to drive the inner runs 27, 28 rearwardly. The chains 25 and 26 are composed of a plurality of links 20 with every fifth link having a lug 21 extending outwardly from its respective run. The chain used in the illustration is also of a conventional design and is of a type widely used on farm implements with the exception of the lug which will be described in detail. Generally speaking each link 21 has an arcuate portion 22 at its leading end and an arcuate portion 23 at its trailing end. The arcuate portion 22 of one link will lap the arcuate portion at the trailing end of the next adjacent link to provide a pivotal connection between the links, thereby making the chain both flexible and operative over chain sprockets. Fig. 4 shows the arcuate portion 22 open, as it exists prior to it being closed around the arcuate portion 23.

The lug itself is composed of a rigid or fingered portion 31 extending into the passage 13 and having a leading surface 32 and a trailing surface 33. The outer tip of the portion 31 is arcuate shaped, as at 34. Extending forwardly, as shown in Fig. 1, or in a trailing direction is an integral flanged portion 35 forming a skirt extending from the trailing surface 33 of the rigid fingered portion 31 to form a substantially U-shaped skirt having leg portions 36 and 37 and a rounded portion 38 extending from the tip 34. As shown in Fig. 4, the flange portion 35 may be an integral part of the lug portion 31, it being pressed into its shape in a usual or conventional manner. An indentation 31a is also pressed into the portion 31 for additional strength. Other methods of fixing a flange to a surface such as welding may be used if desirable. The exact point of juncture between the portion 31 and the flange 35 is formed to effect a radius or a rounded corner, as at 39, thereby eliminating any sharp edges at the juncture. The portions of the legs 36 and 37 of the flange portion 35 extends trailingly as at 40 and 41 to serve as additional truss support for the lug 21. The lug 21 is connected to the link 20 rigidly by means of welding as at 43.

The lug 21 will present a continuous surface to the ears of corn on the snapping rolls which has no sharp edges to dislodge the kernels of corn from the ears. By providing the skirt completely around the edges of the lug portion 31 and extending it in a trailing direction, the only square corner or sharp edges on the lug will be that at the trailing edge of the skirt or flange and the contact with the trailing edge with the ears of corn will be relatively small inasmuch as the ears and stalks will be moved by the forward surface 32 of the fingered portion 31.

What is claimed is:

1. On a corn harvester movable forwardly over a field of row planted corn having housing structure forming a fore-and-aft extending passage for successively receiving stalks of corn as the harvester moves over the field and harvesting mechanism removing the ears from the stalks as they move through the passage; a link chain including a fore-and-aft extending run movable rearwardly adjacent the passage and having lugs thereon; each of the lugs including a rigid fingered portion extending inwardly into the passage, each of the fingered portions having one end fixed to a respective link of the chain and a free end in the passage, and a continuous marginal skirt portion extending around the free end of the fingered portion and in a trailing direction from the fingered portion, the skirt portion and the fingered portion effecting a smooth and rounded corner at their juncture.

2. The invention defined in claim 1, in which the skirt portion is U-shaped and conforms to the shape of the outer edge of the fingered portion and each leg of the U-shaped skirt is fixed to the chain link.

3. The invention defined in claim 2, further characterized by each of said legs having a trailing truss portion for reinforcing the fingered portion.

4. On a corn harvester movable forwardly over a field of row planted corn having housing structure forming a fore-and-aft extending passage for successively receiving stalks of corn as the harvester moves over the field and harvesting mechanism removing the ears from the stalks as they move through the passage; a link chain including a fore-and-aft extending run movable rearwardly adjacent the passage and having lugs thereon, each of the lugs including a rigid fingered portion extending inwardly into the passage, each of the fingered portions having one end fixed to a respective link of the chain and a free end in the passage, and a continuous marginal skirt portion extending around the free end of the fingered portion and in a trailing direction from the fingered portion.

5. A lug mounted on an endless conveyor movable in a given direction, comprising: a rigid fingered portion normal to the conveyor and having one end thereof fixed to the conveyor and a free end spaced from the conveyor; and a continuous marginal skirt portion extending around the free end of the fingered portion and in a trailing direction relative to the direction of travel, the skirt portion and the fingered portion effecting a smooth and rounded corner at their juncture.

6. On a corn harvester movable forwardly over a field of row planted corn having housing structure forming a fore-and-aft extending passage for successively receiving stalks of corn as the harvester moves over the field and harvesting mechanism including a pair of cooperating rotating rolls in the passage adapted to engage the stalks and draw them downwardly while restricting downward passage of the ears; a chain including a fore-and-aft extending run adjacent the passage and movable rearwardly; and lugs on the chain, each lug including a rigid fingered portion extending inwardly into the passage above the rotating rolls and having an arcuate shaped free end, and a continuous marginal skirt portion extending around the free end of the fingered portion and in a trailing direction from the fingered portion, the skirt portion and the fingered portion effecting a smooth and rounded corner at their juncture.

7. A lug mounted on an endless conveyor movable in a given direction, comprising: a rigid fingered portion normal to the conveyor and having one end thereof fixed to the conveyor and an arcuate shaped free end spaced from the conveyor; and a continuous marginal skirt portion extending around the free end of the fingered portion and in a trailing direction relative to the direction of travel of the conveyor.

References Cited in the file of this patent

UNITED STATES PATENTS

| | | |
|---|---|---|
| 1,315,465 | Carbo | Sept. 9, 1919 |
| 1,922,374 | Krause | Aug. 15, 1933 |
| 2,252,159 | Blank | Aug. 12, 1941 |